US009048986B2

(12) United States Patent
Liu et al.

(10) Patent No.: US 9,048,986 B2
(45) Date of Patent: Jun. 2, 2015

(54) MITIGATION OF LOST RESOURCE ALLOCATION SYNCHRONIZATION BETWEEN A USER EQUIPMENT (UE) AND AN EVOLVED NODE B (ENODEB)

(75) Inventors: Zhengwei Liu, San Diego, CA (US); Magnus D. Kretz, San Diego, CA (US); Wanshi Chen, San Diego, CA (US); Xiaoxia Zhang, San Diego, CA (US); Hao Xu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 192 days.

(21) Appl. No.: 13/547,836

(22) Filed: Jul. 12, 2012

(65) Prior Publication Data

US 2013/0039292 A1    Feb. 14, 2013

Related U.S. Application Data

(63) Continuation of application No. 61/523,112, filed on Aug. 12, 2011.

(51) Int. Cl.
| | |
|---|---|
| H04W 4/00 | (2009.01) |
| H04L 5/00 | (2006.01) |
| H04L 1/18 | (2006.01) |
| H04W 72/12 | (2009.01) |
| H04W 72/14 | (2009.01) |

(52) U.S. Cl.
CPC ............ *H04L 5/0044* (2013.01); *H04L 1/1893* (2013.01); *H04W 72/14* (2013.01); *H04W 72/1294* (2013.01)

(58) Field of Classification Search
CPC ..................................................... H04L 1/1893
USPC ........................................................ 370/329
See application file for complete search history.

(56) References Cited

U.S. PATENT DOCUMENTS

| | | | |
|---|---|---|---|
| 2004/0137896 A1* | 7/2004 | Sarkar et al. ................... | 455/423 |
| 2010/0074211 A1* | 3/2010 | Kim et al. ...................... | 370/329 |
| 2010/0091672 A1 | 4/2010 | Ishii | |

(Continued)

FOREIGN PATENT DOCUMENTS

| | | |
|---|---|---|
| JP | 2010502096 A | 1/2010 |
| JP | 2010539845 A | 12/2010 |

(Continued)

OTHER PUBLICATIONS

Machine Translation of WO 2010131931 A2.*

(Continued)

*Primary Examiner* — Huy D Vu
*Assistant Examiner* — Kevin Cunningham
(74) *Attorney, Agent, or Firm* — Seyfarth Shaw LLP

(57) ABSTRACT

A method for mitigation of lost resource allocation synchronization between a user equipment (UE) and an evolved Node B (eNodeB) during a Hybrid Automatic Repeat Request (HARQ) transmission and/or retransmission process is described. The method includes determining whether resource allocation is out of synchronization between a user equipment (UE) and an evolved Node B (eNodeB) during a hybrid automatic repeat request (HARQ) transmission and/or retransmission process. The method further includes mitigating a loss of resource allocation synchronization between the UE and the eNodeB during the HARQ transmission and/or retransmission process.

30 Claims, 6 Drawing Sheets

(56) References Cited

U.S. PATENT DOCUMENTS

| | | | |
|---|---|---|---|
| 2010/0098012 A1* | 4/2010 | Bala et al. ............... | 370/329 |
| 2010/0316096 A1 | 12/2010 | Adjakple et al. | |
| 2010/0331037 A1 | 12/2010 | Jen | |
| 2011/0038302 A1 | 2/2011 | Papasakellariou et al. | |
| 2012/0026985 A1* | 2/2012 | Ren et al. ............... | 370/336 |

FOREIGN PATENT DOCUMENTS

| | | | |
|---|---|---|---|
| JP | 2013537753 A | | 10/2013 |
| KR | 20080030941 A | | 4/2008 |
| WO | 2008041824 A2 | | 4/2008 |
| WO | 2009045011 A1 | | 4/2009 |
| WO | WO 2010131931 A2 | * | 11/2010 |
| WO | 2012014123 A1 | | 2/2012 |

OTHER PUBLICATIONS

International Search Report and Written Opinion—PCT/US2012/046637—-ISA/EPO—Jan. 4, 2013.

LG Electronics: "UL shared channel UE behaviour after ACK/NACK detection and UL synchronous", 3GPP Draft; R1-080277, UL HARQ UE Behavior, 3rd Generation Partnership Project (3GPP), Mobile Competence Centre; 650, Route Des Lucioles; F-06921 Sophia-Anti Polis Cedex; France, vol. RAN WG1, No. Sevilla, Spain; 20080108, Jan. 8, 2008, XP050108799, [retrieved on Jan. 8, 2008] p. 3.

Motorola: "PHICH/PDCCH Interaction", 3GPP Draft; R2-080416, 3rd Generation Partnership Project (3GPP), Mobile Competence Centre; 650, Route Des Lucioles ; F-06921 Sophia-Antipolis Cedex; France, vol. RAN WG2, No. Sevilla, Spain; 20080108, Jan. 8, 2008, XP050138266, [retrieved on Jan. 8, 2008] the whole document.

Partial International Search Report—PCT/US2012/046637—ISA/EPO—Nov. 7, 2012.

Qualcomm Incorporated: "Codeword Selection Details for CQI in MIMO PUSCH",3GPP Draft; R1-106367 CW Selection for CQI in PUSCH, 3rd Generation Partnership Project (3GPP), Mobile Competence Centre; 650, Route Des Lucioles; F-06921 Sophia-Antipolis Cedex; France, vol. RAN WG1, No. Jacksonville, USA; 20101115, Nov. 9, 2010, XP050467022, [retrieved on Nov. 9, 2010].

Qualcomm Incorporated: "UCI and SRS transmission for CA with and without PUSCH present",3GPP Draft; R1-110329 UCI and SRS Transmission for CA With and Without PUSCH Present, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; 20110117-20110121, Jan. 31, 2011, XP050599044, [retrieved on Jan. 31, 2011].

Texas Instruments: "Outstanding issues on dynamic aperiodic SRS", 3GPP Draft; R1-104482 TI Outstanding Issues on Dynamic Aperiodic SRS_V3, 3rd Generation Partnership Project (3GPP), Mobile Competence Centre; 650, Route Des Lucioles; F-06921 Sophia-Antipolis Cedex; France, vol. RAN WG1, No. Madrid, Spain; 20100823, Aug. 17, 2010, XP050449803.

* cited by examiner

MITIGATION OF LOST RESOURCE ALLOCATION SYNCHRONIZATION BETWEEN A USER EQUIPMENT (UE) AND AN EVOLVED NODE B (ENODEB)

CROSS-REFERENCE TO RELATED APPLICATION

The present Application for Patent claims the benefit of U.S. Provisional Application No. 61/523,112 filed Aug. 12, 2011, in the names of Liu et al. the disclosure of which is expressly incorporated by reference herein in its entirety.

BACKGROUND

1. Field

Aspects of the present disclosure generally relate to wireless communication systems, and more particularly to mitigation of lost resource allocation synchronization between a user equipment (UE) and an evolved Node B (eNodeB) during a Hybrid Automatic Repeat Request (HARQ) transmission and/or retransmission process.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect of the present disclosure, a method for mitigating lost resource allocation synchronization between a user equipment (UE) and an evolved Node B (eNodeB) during a Hybrid Automatic Repeat Request (HARQ) transmission and/or retransmission process is described. The method includes determining whether resource allocation is out of synchronization between a user equipment (UE) and an evolved Node B (eNodeB) during a hybrid automatic repeat request (HARQ) transmission and/or retransmission process. The method further includes mitigating a loss of resource allocation synchronization between the UE and the eNodeB during the HARQ transmission and/or retransmission process.

In another aspect, an apparatus for mitigating lost resource allocation synchronization between a UE and an eNodeB during a HARQ transmission and/or retransmission process is described. The apparatus includes at least one processor; and a memory coupled to the at least one processor. The processor is configured to determine whether resource allocation is out of synchronization between a UE and an eNodeB during a HARQ transmission and/or retransmission process. The processor is further configured to mitigate a loss of resource allocation synchronization between the UE and the eNodeB during the HARQ transmission and/or retransmission process.

In a further aspect, a computer program product for mitigating lost resource allocation synchronization between a UE and an eNodeB during a HARQ transmission and/or retransmission process is described. The computer program product includes a non-transitory computer-readable medium having program code recorded thereon. The computer program product has program code to determine whether resource allocation is out of synchronization between a UE and an eNodeB during a HARQ transmission and/or retransmission process. The computer program product further includes program code to mitigate a loss of resource allocation synchronization between the UE and the eNodeB during the HARQ transmission and/or retransmission process.

In another aspect, an apparatus for mitigating lost resource allocation synchronization between a UE and an eNodeB during a HARQ transmission and/or retransmission process is described. The apparatus includes means for determining whether resource allocation is out of synchronization between a UE and an eNodeB during a HARQ transmission and/or retransmission process. The apparatus also includes means for mitigating a loss of resource allocation synchronization between the UE and the eNodeB during the HARQ transmission and/or retransmission process.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
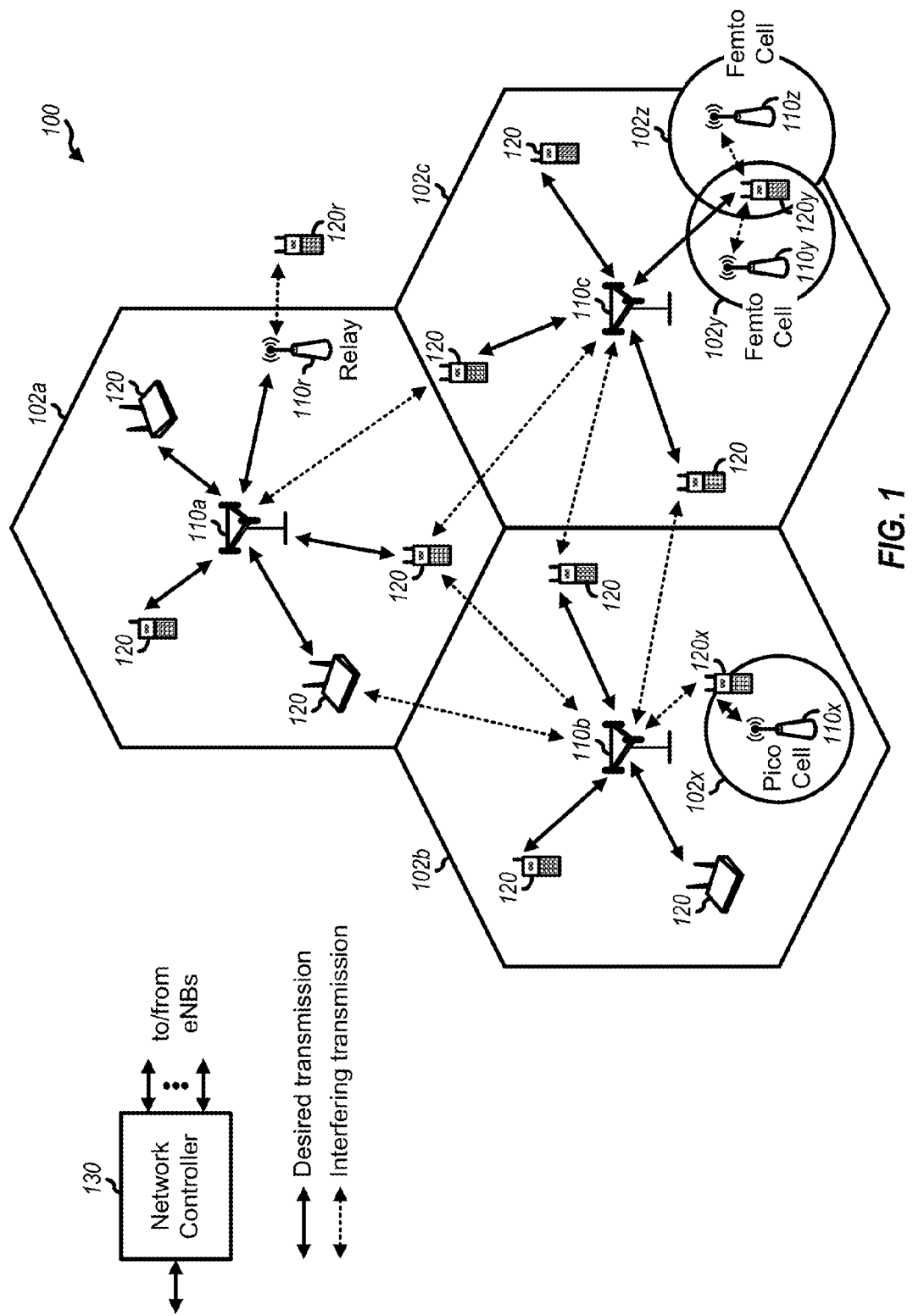
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various aspects of the disclosure provide techniques to mitigate loss of resource allocation synchronization between a user equipment (UE) and an evolved Node B (eNodeB) during a Hybrid Automatic Repeat reQuest (HARQ) transmission and/or retransmission process. In one aspect of the disclosure, an eNodeB determines whether resource allocation is out of synchronization between the UE and the eNodeB during the HARQ transmission and/or retransmission process. In this aspect of the disclosure, the eNodeB mitigates a loss of resource allocation synchronization between the UE and the eNodeB during the HARQ transmission and/or retransmission process. In a further aspect of the disclosure, the eNodeB may estimate whether the UE received an uplink grant for a physical uplink shared channel (PUSCH) HARQ transmission or retransmission. Based on the estimate, the eNodeB will communicate with the UE to re-synchronize the uplink control information (UCI) and PUSCH multiplexing parameters to enable proper decoding of received PUSCH data and uplink control information.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS).

3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network, in which mitigation of non-synchronization between a user equipment (UE) and an evolved Node B (eNodeB) during Physical Uplink Shared Channel (PUSCH) Hybrid Automatic Repeat Request (HARQ) retransmission may be implemented. The wireless communication network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110*a*, 110*b* and 110*c* are macro eNodeBs for the macro cells 102*a*, 102*b* and 102*c*, respectively. The eNodeB 110*x* is a pico eNodeB for a pico cell 102*x*. And, the eNodeBs 110*y* and 110*z* are femto eNodeBs for the femto cells 102*y* and 102*z*, respectively. An eNodeB may support one or multiple (e.g., two, three, four, and the like) cells.

The wireless communication network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110*r* may communicate with the eNodeB 110*a* and a UE 120*r* in order to facilitate communication between the eNodeB 110*a* and the UE 120*r*. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect of the disclosure, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
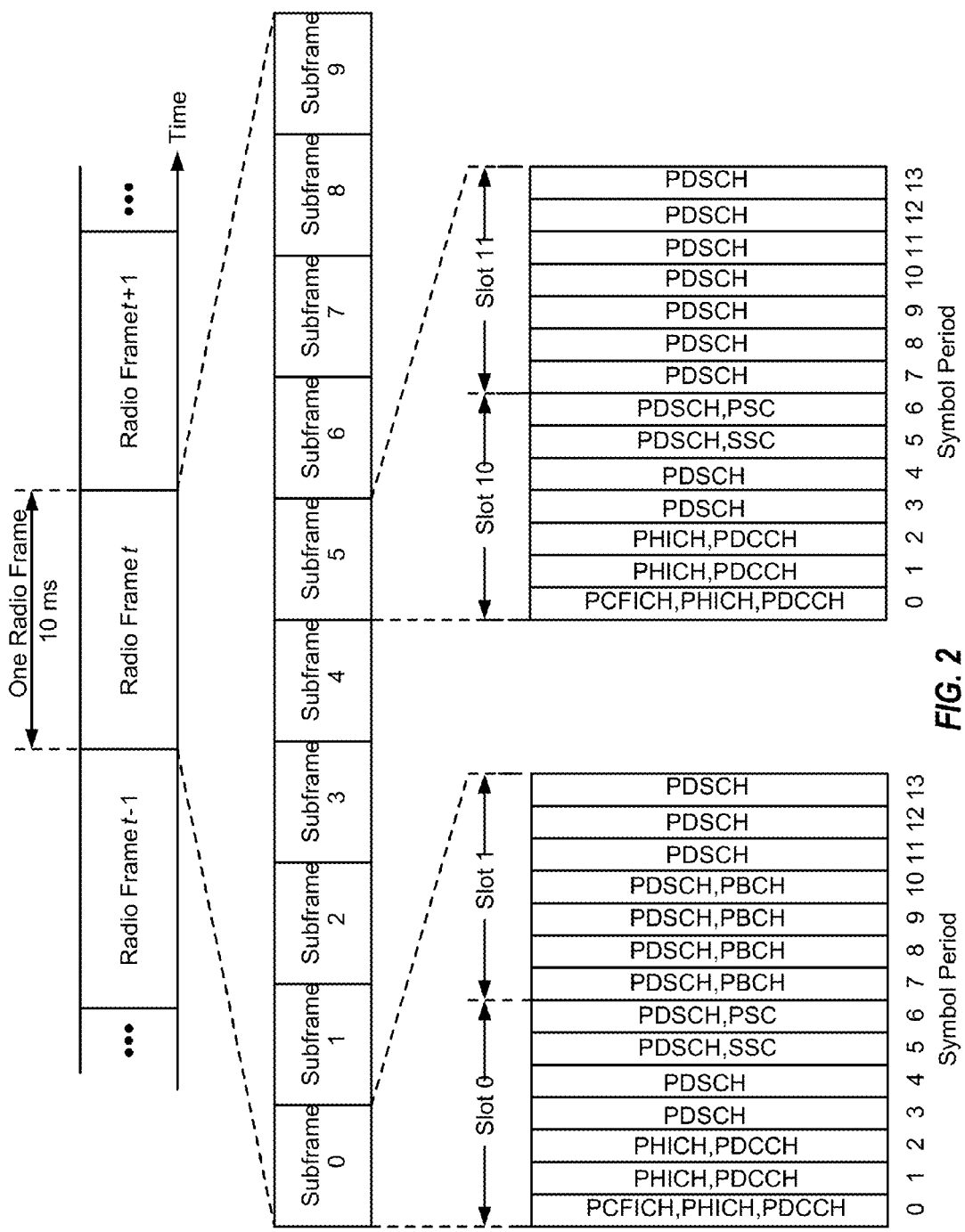
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
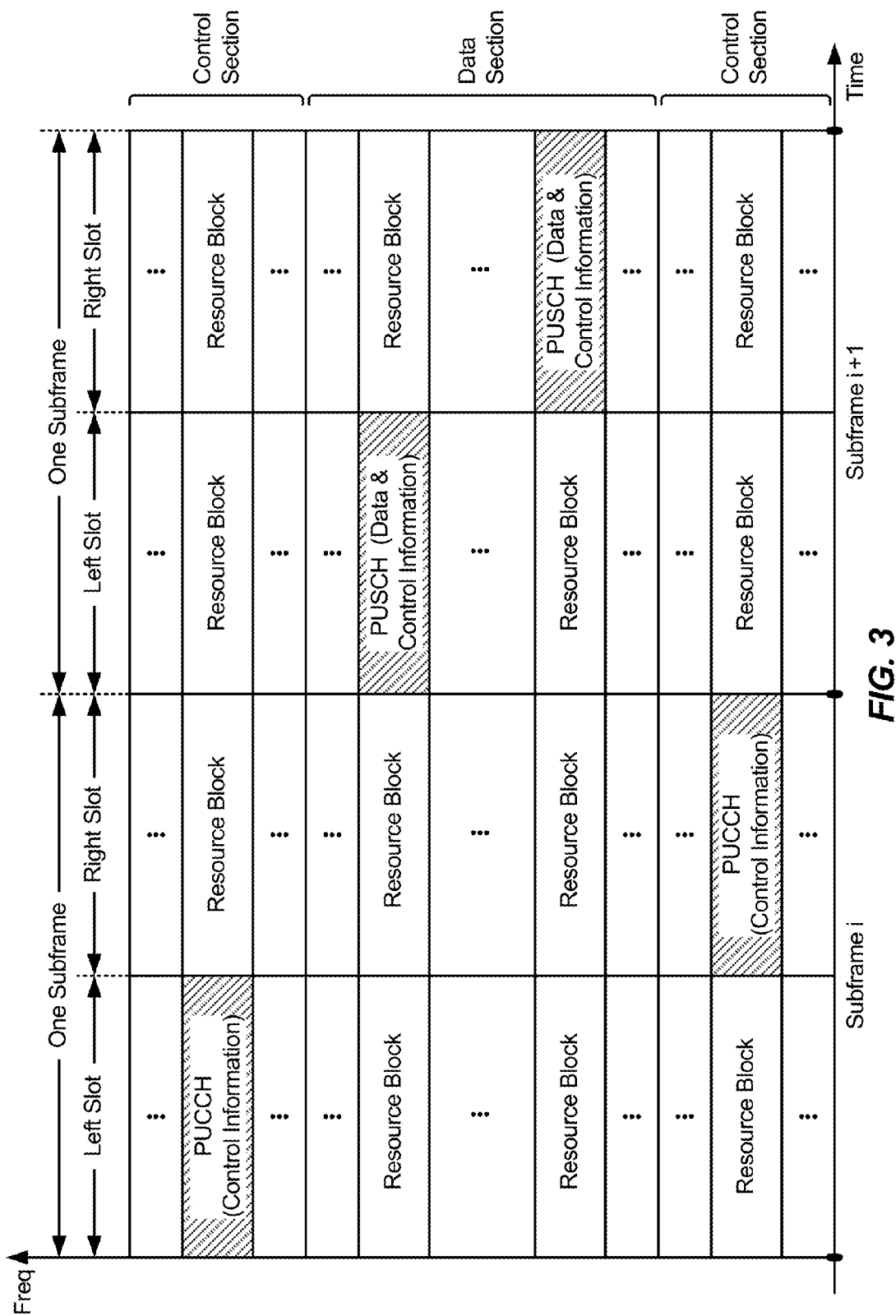
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect of the disclosure, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), SRS (sounding reference signal), PBCH, PUCCH, PUSCH, PDCCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
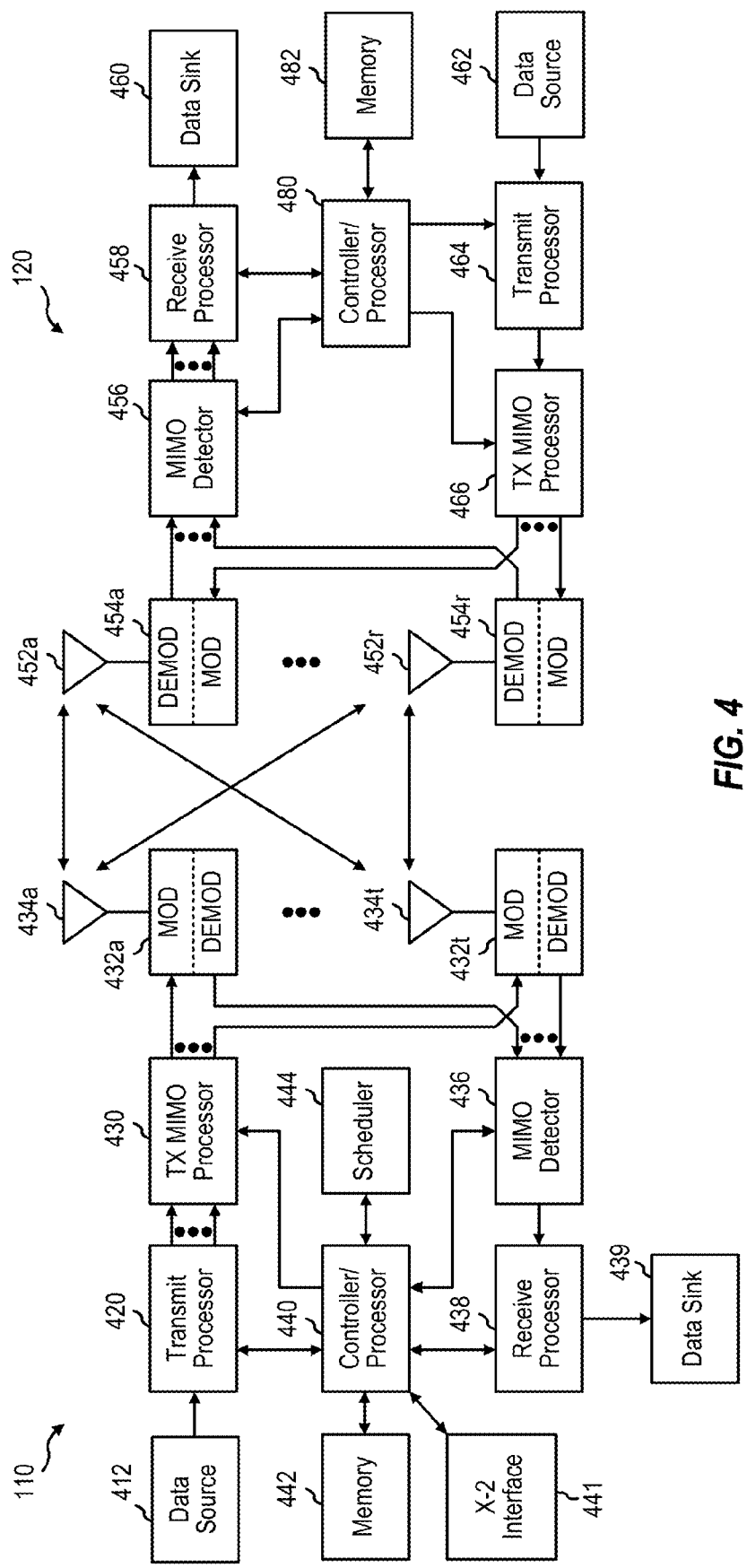
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The controller/processor 440 and/or other processors and modules at the base station 110 may perform or direct the execution of various processes for the techniques described herein. The controller/processor 480 and/or other processors and modules at the UE 120 may also perform or direct the execution of the functional blocks illustrated in use method flow chart FIG. 5, and/or other processes for the techniques described herein. The memories 442 and 482 may store data and program codes for the base station 110 and the UE 120, respectively. A scheduler 444 may schedule UEs for data transmission on the downlink and/or uplink.

Loss Mitigation During HARQ Transmission/Retransmission

Various aspects of the disclosure provide techniques to mitigate loss of resource allocation synchronization between a user equipment (UE) and an evolved Node B (eNodeB) during a hybrid automatic repeat request (HARQ) transmission and/or retransmission process. HARQ is used in LTE for physical downlink shared channel (PDSCH) and physical uplink shared channel (PUSCH) operation. When a packet is received correctly, a positive acknowledgement (ACK) is sent to the transmitter. When a packet cannot be received correctly, a negative acknowledgement (NAK) is sent to the transmitter to request a retransmission of the same packet. Such a process continues until the packet is received correctly or the number of retransmissions reaches a pre-defined limit.

For the uplink PUSCH transmission, the eNodeB transmits an uplink grant message on the PDCCH to a target UE to indicate that the UE is allowed to transmit on the PUSCH four or more than four ms later on certain physical resource blocks (PRBs) and with a certain packet size. Upon reception, the UE transmits data in the designated physical resource blocks and subframe. Once the eNodeB receives the PUSCH transmission, the eNodeB sends a control message to the UE as part of the HARQ process. The control message can be an ACK/NAK bit on a Physical HARQ indicator channel (PHICH) of the downlink. The control message can also be an uplink grant message for a PUSCH retransmission (PUSCH packet reception failed) or a new transmission (PUSCH packet reception was successful).

In LTE, retransmission of erroneous data units detected by an eNodeB may be overcome by a HARQ mechanism in the Media Access Control (MAC) layer. In physical layer specifications such as LTE, Evolution-Data Optimized (EV-DO), WCDMA, etc., the mobile station nodes (UEs) and base station nodes (eNodeBs) employ a Hybrid Automatic Repeat reQuest (HARQ) scheme to improve the data throughput and increase the transmission reliability. The HARQ scheme provides transmission reliability by temporarily storing decision metrics that can be combined with subsequent decision metrics from data retransmissions ("soft combining"). As described herein, the term "decision metric" may refer to a posterior probability or likelihood (soft value) of transmitted bits being a "0" or a "1" including, but not limited to, log-likelihood ratios (LLRs). Groups of such decision metrics may be analyzed by a decoder to decode a transmitted sequence (e.g., a transport block).

As indicated above, in LTE an eNodeB issues an initial uplink grant through the PDCCH. During a PUSCH HARQ retransmission process, the eNodeB usually issues a PHICH NAK to the UE. For adaptive PUSCH retransmission, the eNodeB issues a retransmission uplink grant. If the UE receives both the PDCCH uplink grant and the PHICH for the same subframe, the PDCCH uplink grant takes higher priority. In one aspect of the disclosure, resource allocation synchronization loss between the eNodeB and the UE may occur when the UE fails to receive the initial uplink grant. In particular, the following adaptive uplink grant may impact the number of resource elements (REs) of an uplink control information (UCI) calculation for the following retransmission opportunities, which will result in a UCI decode failure, and may also result in PUSCH decode failure. In one aspect of the disclosure, the eNodeB may estimate whether the UE received an initial uplink grant for a PUSCH HARQ retransmission. Based on the estimate, the eNodeB will communicate with the UE to re-synchronize the UCI to enable proper decoding of the received PUSCH data.

In an adaptive HARQ protocol, except for the transmission block size, all other transmission parameters can be changed between retransmissions. By contrast, a non-adaptive HARQ protocol is triggered by a PHICH message. In that case, the transport block size and the other transmission parameters remain the same for the retransmission; however, the Redundancy Version (RV) may be different. A PUSCH HARQ retransmission may be adaptive or non-adaptive. A non-adaptive retransmission may be triggered by a PHICH message.

An adaptive retransmission may be triggered by a PDCCH uplink grant as well as a PHICH message. In an adaptive retransmission, a Transport Block size (TBSize) remains the same for the retransmission, whereas all the other transmission parameters can be changed between a current retransmission and a previous transmission/retransmission. The transmission parameters may include, but are not limited to (1) a start location of the Resource Blocks (RBs); (2) cyclic shifts; (3) a number of Resource Blocks (RBs); (4) a modulation, and/or an RV (Redundancy Version as derived from the Modulation and Coding Scheme (MCS)); and (5) Uplink Control Information (UCI) (e.g., a Rank Indicator (RI)/Uplink Acknowledgement (ULACK)/Periodic Channel Quality Indicator (P-CQI)/Aperiodic CQI (AP-CQI), and a Sounding Reference Signal (SRS) (Periodic SRS (P-SRS)/Aperiodic SRS (AP-SRS))).

For example, in an adaptive retransmission, an explicit MCS retransmission (e.g., MCS 0 to 28) can change the modulation and the Redundancy Version (RV). An implicit MCS retransmission (e.g., MCS 29 to 31) may change the RV, a number of Resource Blocks (RBs), and reuse the modulation of the last transmission.

Unfortunately, a UE may lose the initial uplink grant. The number of coded modulation symbols of the uplink control information on a subsequent PUSCH retransmission, however, are dependent on the initial PUSCH transmission's number of Resource Blocks (RBs) and a number of the PUSCH symbols. As described herein, synchronization between the UE and the eNodeB for the above-indicated transmission parameters, including the assigned resource elements for control and data, may be referred to as "resource allocation synchronization." When the UE loses the initial uplink grant, the UE is unable to perform any of the subsequent retransmissions when a non-adaptive PUSCH retransmission is requested by the eNodeB due to a loss of resource allocation synchronization between the UE and the eNodeB.

By contrast, for an adaptive PUSCH retransmission, an assumption of the number of the Single Carrier Frequency Division Multiple Access (SC-FDMA) symbols for each subframe from the initial PUSCH transmission for the same transport block between the UE and the eNodeB will be different if the UE SRS situation changes, which results in a different number of PUSCH symbols. Similarly, the scheduled bandwidth for the PUSCH transmission in the current sub-frame for the transport block (e.g., expressed as a number of subcarriers) is different between the UE and the eNodeB if the number of resource blocks changes. Consequently, for an adaptive PUSCH retransmission, a change in the number of the SC-FDMA symbols or the scheduled bandwidth for the PUSCH transmission results in a loss of synchronization between the UE and the eNodeB.

In particular, the UE may use a subsequent adaptive PUSCH uplink grant that was successfully decoded as the initial transmission. Conversely, the eNodeB may use a new transmission of a PUSCH uplink grant to derive the initial parameters. As a result, a loss of resource allocation synchronization between the UE and the eNodeB occurs during a PUSCH HARQ transmission and/or retransmission process.

For example, if the Uplink Control Information (UCI) includes an Uplink Acknowledgement (ULACK), the ULACK may cause a decoding failure. Similarly, if the UCI includes a Rank Indicator (RI), a Channel Quality Indicator (CQI), or a Sounding Reference Signal (SRS), a PUSCH rate matching result is also impacted. As a result, the lack of resource allocation synchronization between the UE and the eNodeB may lead to both a UCI decode failure and a PUSCH data decode failure. In addition, the corrupted PUSCH decoded symbols may do more damage to the soft-combining that is performed as part of the HARQ process.

In LTE, the probability of a UE missing an uplink grant is generally designed to occur approximately one percent (1%) of the time. In addition, when a UE misses the uplink grant, the PUSCH HARQ resources may be wasted for up to a maximum number of retransmissions. Moreover, the PUSCH transmission/reception is generally on a critical path of any LTE deployment. As a result, any performance enhancement for the PUSCH HARQ transmission and/or retransmission may have a substantial impact on the system.

Various aspects of the disclosure provide techniques to mitigate loss of resource allocation synchronization between a UE and an eNodeB during a HARQ transmission and/or retransmission. In one aspect of the disclosure, the eNodeB determines whether resource allocation is out of synchronization between the UE and the eNodeB during a HARQ transmission and/or retransmission process. For example, when the UE loses the uplink grant for a PUSCH HARQ retransmission, resource allocation synchronization between the UE and the eNodeB is lost. As described herein, the uplink grant may refer to an initial uplink grant or an adaptive PUSCH retransmission uplink grant. In a further aspect of the disclosure, the eNodeB mitigates a loss of resource allocation synchronization between the UE and the eNodeB during the HARQ transmission and/or retransmission process. In this aspect of the disclosure, the eNodeB may mitigate the lost synchronization with blind decoding to enable proper decoding of the received PUSCH data and/or uplink control information (UCI) over the PUSCH. In a further aspect, the eNodeB may regenerate the same uplink grant to re-enforce synchronization between the UE and the eNodeB for the PUSCH HARQ retransmission. In a further aspect, the eNodeB may abort the PUSCH retransmission ahead of time to mitigate the lost synchronization.

In one aspect of the disclosure, the eNodeB may adjust a weight of a Physical Downlink Control Channel (PDCCH) by giving the uplink grant more weight to reduce its error rate below a normal PDCCH error rate. In a further aspect of the disclosure, the eNodeB may treat the PUSCH HARQ retransmission as a new transmission. In a further aspect of the disclosure, the eNodeB may simultaneously receive a Physical Uplink Control Channel (PUCCH) over a PUCCH resource and the PUSCH over a PUSCH resource (e.g., with release 10 UEs) for initiating lost resource allocation synchronization. In one aspect of the disclosure, the simultaneous receipt of the PUCCH and the PUSCH eliminates the dependency on determining the Uplink Control Information (UCI) from the uplink grant.

In yet another aspect of the disclosure, mitigation of lost resource allocation synchronization between a UE and an eNodeB during a PUSCH HARQ retransmission may include estimating whether the UE received an uplink grant for the PUSCH HARQ retransmission. In one aspect of the disclosure, the estimation is performed by detecting an energy level on the PUSCH. The energy level may be determined according to a demodulation reference signal (DM-RS), which may be referred to herein as "PUSCH/DM-RS thresholding". In one aspect of the disclosure, the eNodeB determines that the uplink grant was not received by the UE when the energy level detected on the PUSCH is below a predetermined threshold. In one aspect of the disclosure, the accumulated energy is based on, for example, a soft-combining of log-likelihood ratios (LLRs).

In one aspect of the disclosure, the eNodeB discards the received PUSCH data when it is estimated that the uplink grant was not received by the UE. In a further aspect of the disclosure, the eNodeB transmits a physical HARQ indicator channel (PHICH) separate from a physical downlink control channel (PDCCH). Alternatively, the PHICH is not transmitted if an uplink grant is transmitted over the PDCCH. The separate transmission of the PHICH and the PDCCH prevents situations where the UE misses the PDCCH and enters a discontinuous transmission (DTX) state, rather than sending a retransmitted transport block, assuming a non-adaptive HARQ. In one configuration, the PHICH message is not sent at all.

In a further aspect of the disclosure, mitigation of lost synchronization resource allocation between a UE and an eNodeB during a PUSCH HARQ retransmission may include blindly decoding the PUSCH and a Physical Uplink Control Channel (PUCCH). The eNodeB may determine that the uplink grant was not received by the UE when a successfully decoded PUCCH includes the Uplink Control Information (UCI). The eNodeB may discard the received PUSCH data when it is estimated that the initial uplink grant was not received by the UE.

In a further aspect of the disclosure, mitigation of lost synchronization resource allocation between a UE and an eNodeB during a PUSCH HARQ retransmission may include detecting a number of consecutive retransmission decode failures of the PUSCH data, as well as UCI decoding failures over the PUSCH. In particular, if an initial uplink grant is missed, this can result in a decoding failure for all UCI on subsequent PUSCH retransmissions due to lost resource allocation synchronization. The eNodeB may predict that the grant was not received by the UE when the number of consecutive retransmission decode failures of the PUSCH data and/or the decoding failures of the UCI over the PUSCH exceeds a predetermined value. The eNodeB may discard the received PUSCH data when it is estimated that the initial uplink grant was not received by the UE.

In one aspect of the disclosure, a blind decoding may be combined with the PUSCH/DM-RS energy thresholding, as described above, to mitigate lost synchronization due to lost resource allocation synchronization between a UE and an eNodeB during the PUSCH HARQ retransmission. In particular, the eNodeB may decode the received PUSCH data and the UCI according to a previous uplink grant. In addition, the eNodeB may decode the received PUSCH data and the UCI according to an initial uplink grant. Thus, the number of hypotheses for blind decoding is reduced. The eNodeB keeps the properly decoded PUSCH data and the UCI and discards the erroneously decoded PUSCH data the erroneously decoded UCI.

In yet another aspect of the disclosure, mitigation of lost resource allocation synchronization may include retransmitting the uplink grant through a Physical Downlink Control Channel (PDCCH) when in doubt of whether the UE missed an initial uplink grant. The retransmitting of the UL grant could account for a Sounding Reference Signal (SRS). The availability of a last symbol for the PUSCH should remain the same between re-transmissions to ensure that the same Resource Element (RE) computation results from the Uplink Control Information (UCI). This, however, may not be possible due to a cell-specific SRS configuration or a UE-specific SRS configuration. If a cell-specific SRS does not occupy the whole bandwidth, and the PUSCH data fits in the unoccupied Resource Blocks (RBs), the PUSCH retransmission may have more flexibility to match the original transmission. In one aspect of the disclosure, the subsequent uplink grant from the PDCCH data is performed according to a number of Resource Elements (REs) calculated from the UCI provided with an initial uplink grant to ensure the same number of REs are calculated from the UCI.

In one aspect of the disclosure, the PDCCH uplink grant may ensure that the same Resource Elements (REs) are computed for the UCI and the same PUSCH decoding parameters are also generated with the initial uplink grant to resynchronize the resource allocation between the UE and the eNodeB.

The eNodeB may transmit a subsequent uplink grant through a Physical Downlink Control Channel (PDCCH) data according to a number of Resource Blocks (RBs) provided with the initial uplink grant. The eNodeB may decode the received PUSCH data assuming the presence of a Sounding Reference Signal (SRS). The eNodeB may also decode the received PUSCH data assuming the absence of an SRS. The eNodeB selects the successfully decoded PUSCH data and discards the erroneously decoded PUSCH data.

In yet another aspect of the disclosure, mitigation of lost resource allocation synchronization between a UE and an eNodeB during a PUSCH HARQ retransmission may include reducing the maximum number of retransmissions. Reducing the maximum number of retransmissions may decrease the wasted HARQ resource when resource allocation synchronization is lost between a UE and an eNodeB during a HARQ transmission and/or retransmission process. In one aspect of the disclosure, the eNodeB determines that the initial uplink grant was not received by the UE when accumulated energy of received PUSCH data does not increase over a number of consecutive retransmission decode failures.

In one aspect of the disclosure, the eNodeB determines the accumulated energy of the received PUSCH data based on, for example, soft-combining of log-likelihood ratios (LLRs) over the consecutive retransmissions. Based on the determination, the eNodeB may transmit a PHICH Negative Acknowledgement (NAK) to the UE. In addition, the eNodeB transmits a new, initial uplink grant signal to the UE according to the last initial uplink grant, to reset the UE. The eNodeB aborts the PUSCH HARQ retransmission prior to the maximum number of retransmissions, which may or may not have been reduced.

In a further aspect of the disclosure, mitigation of lost resource allocation synchronization between a UE and an eNodeB during a HARQ transmission and/or retransmission process may include increasing a power level and/or an aggregation level of a Physical Downlink Control Channel (PDCCH). Increasing a power level and/or an aggregation level of the PDCCH may be performed when it predicts that the initial uplink grant may not be received by the UE. In one aspect of the disclosure, the prediction of whether the UE will receive the initial uplink grant may be based on historic data. In particular, the eNodeB may reduce the uplink grant error rate for the initial uplink grant below one percent (1%) by adding more weight to the initial uplink grant. For example, if the eNodeB is in doubt as to whether the UE received the uplink grant (e.g., the eNodeB has detected that the UE's PDCCH is weak in previous radio frames), the eNodeB may decrease the uplink grant's error probability by using an increased aggregation level, or increased power for that uplink grant.

In yet another aspect of the disclosure, mitigation of lost resource allocation synchronization between a UE and an eNodeB during a HARQ transmission and/or retransmission process may include synchronizing a number of transmissions in response to receiving a retransmission. The eNodeB performs a transmission synchronization with the UE by transmitting a new initial uplink grant for an initial transmission to the UE according to a previous initial uplink grant. Synchronizing the transmission number between the eNodeB and the UE is performed when it is estimated that the initial uplink grant was not received by the UE.

In particular, if the eNodeB is in doubt of whether the UE missed the initial uplink grant, the eNodeB may treat the retransmission as an initial transmission, and the retransmitted transport block as a new transmission, and discount the lost PUSCH transmission from the total number of PUSCH HARQ transmissions. In one aspect of the disclosure, a new transmission will allow the transmission number on the eNodeB to synchronize with the UE. In one aspect of the disclosure, the UE may synchronize the Revision Version (RV) in response to receiving a retransmission by using an adaptive PUSCH retransmission uplink grant for synchronizing the number of transmissions.

In case of an advanced receiver (e.g., a UE in compliance with LTE release 10 or later) other solutions are possible. For example, the UE could simultaneously transmit PUCCH and PUSCH. Thus, the UCI is no longer dependent of the uplink grant.

Figure 5:
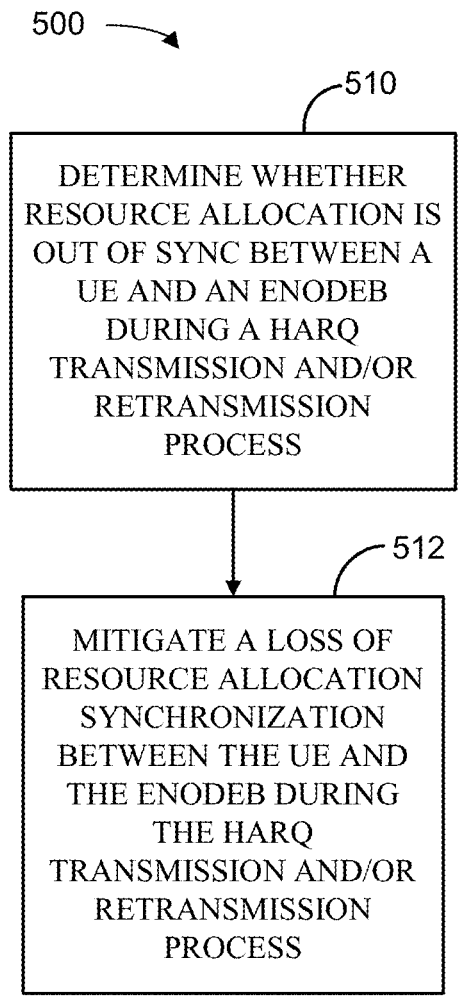
FIG. 5 is a block diagram illustrating a method for mitigation of lost resource allocation synchronization between a UE and an eNodeB during a hybrid automatic repeat request (HARQ) transmission and/or retransmission process, according to one aspect of the present disclosure.

FIG. 5 illustrates a method 500 for mitigation of lost resource allocation synchronization between a UE and an eNodeB during a HARQ transmission and/or retransmission process, according to an aspect of the disclosure of the present disclosure. In block 510, the eNodeB determines whether resource allocation is out of synchronization between the UE and the eNodeB during the HARQ transmission and/or retransmission process. In one aspect of the disclosure, the determination is performed by detecting an energy level on a PUSCH. In particular, the eNodeB may determine that an initial uplink grant or an adaptive PUSCH retransmission uplink grant was not received by the UE when an energy level detected on the PUSCH is below a predetermined threshold. In one aspect of the disclosure, the detected energy is based on an accumulated energy over a consecutive number of PUSCH HARQ retransmissions. The accumulated energy can be based on, for example, a soft-combining of log-likelihood ratios (LLRs) over a predetermined number of consecutive PUSCH HARQ retransmissions.

Referring again to FIG. 5, in block 512, the eNodeB mitigates the loss of resource allocation synchronization between the UE and the eNodeB during the HARQ transmission and/or retransmission process. In one aspect of the disclosure, the eNodeB aborts a PUSCH HARQ retransmission prior to a maximum number of retransmissions, which may or may not have been reduced, to mitigate the loss of resource allocation synchronization. In a further aspect of the disclosure, increasing a power level and/or an aggregation level of a Physical Downlink Control Channel (PDCCH) may be performed when it is estimated that an initial uplink grant was not received by the UE. In particular, the eNodeB may reduce the uplink grant error rate for the initial uplink grant below one percent (1%) by adding more weight to the initial uplink grant.

Figure 6:
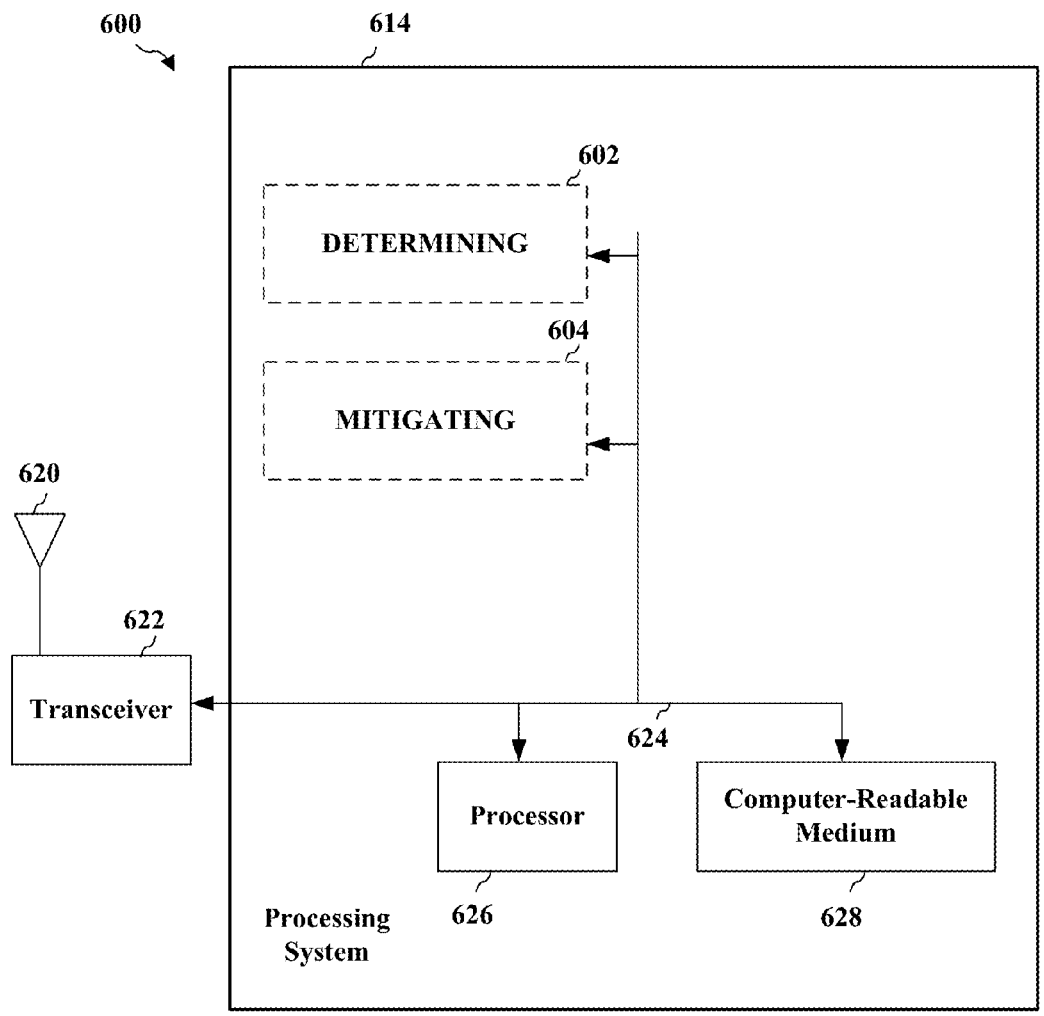
FIG. 6 is a diagram illustrating an example of a hardware implementation for an apparatus mitigating lost resource allocation synchronization.

FIG. 6 is a diagram illustrating an example of a hardware implementation for an apparatus 600 employing a lost resource allocation synchronization mitigation system 614. The lost resource allocation synchronization mitigation system 614 may be implemented with a bus architecture, represented generally by a bus 624. The bus 624 may include any number of interconnecting buses and bridges depending on the specific application of the lost resource allocation synchronization mitigation system 614 and the overall design constraints. The bus 624 links together various circuits including one or more processors and/or hardware modules, represented by a processor 626, a determining module 602, a mitigation module 604, and a computer-readable medium 628. The bus 624 may also link various other circuits such as timing sources, peripherals, voltage regulators, and power management circuits, which are well known in the art, and therefore, will not be described any further.

The apparatus includes the lost resource allocation synchronization mitigation system 614 coupled to a transceiver 622. The transceiver 622 is coupled to one or more antennas 620. The transceiver 622 provides a means for communicating with various other apparatus over a transmission medium. The lost resource allocation synchronization mitigation system 614 includes the processor 626 coupled to the computer-readable medium 628. The processor 626 is responsible for general processing, including the execution of software stored on the computer-readable medium 628. The software, when executed by the processor 626, causes the lost resource allocation synchronization mitigation system 614 to perform the various functions described supra for any particular apparatus. The computer-readable medium 628 may also be used for storing data that is manipulated by the processor 626 when executing software.

The lost resource allocation synchronization mitigation system 614 further includes the determining module 602 for determining whether resource allocation is out of synchronization between a UE and an eNodeB during a HARQ transmission and/or retransmission process and the mitigation module 604 for mitigating a loss of resource allocation synchronization between the UE and the eNodeB during the HARQ transmission and/or retransmission process. The determining module 602 and the mitigating module 604 may be software modules running in the processor 626, resident/stored in the computer readable medium 628, one or more hardware modules coupled to the processor 626, or some combination thereof. The lost resource allocation synchronization mitigation system 614 may be a component of the UE 120 and may include the memory 482 and/or the controller/processor 480.

In one configuration, the apparatus 600 for wireless communication includes means for determining whether resource allocation is out of synchronization between a UE and an eNodeB during a HARQ transmission and/or retransmission process. The means may be the determining module 602 and/or the lost resource allocation synchronization mitigation system 614 of the apparatus 600 configured to perform the functions recited by the measuring and recording means. As described above, the determining means may include antenna 452, receive processor 458, controller/processor 480, and/or memory 482. In another aspect, the aforementioned means may be any module or any apparatus configured to perform the functions recited by the aforementioned means.

In one configuration, the apparatus 600 for wireless communication includes means for mitigating a loss of resource allocation synchronization between the UE and the eNodeB during the HARQ transmission and/or retransmission process. The means may be the mitigating module 602 and/or the lost resource allocation synchronization mitigation system 614 of the apparatus 600 configured to perform the functions recited by the measuring and recording means. As described above, the determining means may include the antenna 452, the receive processor 458, the transmit processor 464, controller/processor 480, and/or memory 482. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    predicting, by an evolved Node B (eNodeB), loss of an initial uplink grant prior to transmission of the initial uplink grant to a user equipment (UE) based on historical data; and
    mitigating a potential loss of resource allocation synchronization between the UE and the eNodeB by transmitting the initial uplink grant at an increased power level and/or an aggregation level from a current power level and/or a current aggregation level of a physical downlink control channel (PDCCH) when the initial uplink grant loss is predicted prior to transmission of the initial uplink grant.

2. The method of claim 1, further comprising determining whether the resource allocation is out of synchronization between the UE and the eNodeB by:
    detecting an energy level on a physical uplink shared channel (PUSCH); and
    determining that an uplink grant was not received by the UE when the energy level detected on the PUSCH is below a predetermined threshold.

3. The method of claim 1, in which mitigating the loss of resource allocation synchronization between the UE and the eNodeB further comprises discarding physical uplink shared channel (PUSCH) data when it is estimated that an uplink grant was not received by the UE due to a loss of the resource allocation synchronization between the UE and the eNodeB.

4. The method of claim 1, in which mitigating the loss of resource allocation synchronization between the UE and the eNodeB comprises not transmitting a physical hybrid automatic repeat request (HARQ) indicator channel (PHICH) when an uplink grant is transmitted over the physical downlink control channel (PDCCH).

5. The method of claim 1, further comprising determining whether the resource allocation is out of synchronization between the UE and the eNodeB by:
    blindly decoding a physical uplink shared channel (PUSCH) and the physical uplink control channel (PUCCH); and
    determining that an uplink grant was not received by the UE when a successfully decoded PUCCH includes uplink control information (UCI) due to a loss of resource allocation synchronization between the UE and the eNodeB.

6. The method of claim 1, further comprising determining whether the resource allocation is out of synchronization between the UE and the eNodeB by:
    detecting a number of consecutive retransmission decode failures of uplink control information (UCI) over a physical uplink shared channel (PUSCH) and PUSCH data; and
    determining that the initial uplink grant was not received by the UE over the PUSCH when the number of consecutive retransmission decode failures of the UCI over the PUSCH and the PUSCH data exceeds a predetermined value due to a loss resource allocation synchronization between the UE and the eNodeB.

7. The method of claim 1, in which mitigating the loss of resource allocation synchronization between the UE and the eNodeB comprises:
    decoding received physical uplink shared channel (PUSCH) data and uplink control information (UCI) according to a previous uplink grant; and
    decoding the received PUSCH data and the UCI according to the initial uplink grant.

8. The method of claim 1, in which mitigating the loss of resource allocation synchronization between the UE and the eNodeB comprises:
    transmitting a subsequent uplink grant through the physical downlink control channel (PDCCH) according to a number of physical uplink shared channel (PUSCH) resource blocks (RBs) and presence or absence of a sounding reference signal (SRS) in response to the initial uplink grant to ensure a same number of resource elements (REs) are calculated for uplink control information (UCI).

9. The method of claim 1, in which mitigating the loss of resource allocation synchronization between the UE and the eNodeB comprises:
    transmitting a subsequent uplink grant through the physical downlink control channel (PDCCH) according a number of resource blocks of a physical uplink shared channel (PUSCH) provided with the initial uplink grant;
    decoding received PUSCH data assuming presence of a sounding reference signal (SRS);
    decoding the received PUSCH data assuming absence of the SRS; and
    selecting the decoded PUSCH data assuming the presence of the SRS or the decoded PUSCH data assuming the absence of the SRS as successfully decoded PUSCH data.

10. The method of claim 1, further comprising determining whether the resource allocation is out of synchronization between the UE and the eNodeB by:
    determining the uplink grant was not received by the UE over a physical uplink shared channel (PUSCH) when an accumulated energy of received PUSCH data does not increase over a number of consecutive retransmission decode failures during a hybrid automatic repeat request (HARQ) transmission and/or retransmission process.

11. The method of claim 1, in which mitigating the loss of resource allocation synchronization between the UE and the eNodeB comprises:
    transmitting a physical hybrid automatic repeat request (HARQ) indicator channel (PHICH) negative acknowledgement (NAK) to the UE; and
    transmitting a new, initial transmission uplink grant to the UE according to the initial uplink grant.

12. The method of claim 1, in which mitigating the loss of resource allocation synchronization between the UE and the eNodeB comprises synchronizing a redundancy version (RV) in response to receiving a hybrid automatic repeat request (HARQ) retransmission by synchronizing a number of transmission by discounting a lost uplink grant or using an adaptive physical uplink shared channel (PUSCH) retransmission uplink grant to prevent a loss of RV synchronization between the UE and the eNodeB.

13. The method of claim 1, in which mitigating the loss of resource allocation synchronization between the UE and the eNodeB comprises communicating with the UE according to an estimate of whether the UE received the initial uplink grant for a physical uplink shared channel (PUSCH) hybrid automatic repeat request (HARQ) retransmission.

14. The method of claim 1, further comprising simultaneously receiving a physical uplink shared channel (PUSCH), over a PUSCH resource, and a physical uplink control channel (PUCCH), over a PUCCH resource.

15. An apparatus configured for operation in a wireless communication network, the apparatus comprising:
a memory; and
at least one processor coupled to the memory, the at least one processor being configured:
to predict loss of an initial uplink grant prior to transmission of the initial uplink grant to a user equipment (UE) based on historical data; and
to mitigate a potential loss of resource allocation synchronization between the UE and an evolved Node B (eNodeB) by increasing a power level and/or an aggregation level from a current power level and/or a current aggregation level of a physical downlink control channel (PDCCH) when the initial uplink grant loss is predicted prior to transmission of the initial uplink grant.

16. The apparatus of claim 15, in which the at least one processor is further configured to determine whether the resource allocation is out of synchronization by:
detecting an energy level on a physical uplink shared channel (PUSCH); and
determining that an uplink grant was not received by the UE when the energy level detected on the PUSCH is below a predetermined threshold.

17. The apparatus of claim 15, in which the at least one processor is further configured to mitigate the loss of resource allocation synchronization between the UE and the eNodeB by discarding physical uplink shared channel (PUSCH) data when it is estimated that an uplink grant was not received by the UE due to a loss of resource allocation synchronization between the UE and the eNodeB.

18. The apparatus of claim 15, in which the at least one processor is further configured to mitigate the loss of resource allocation synchronization between the UE and the eNodeB by not transmitting a physical hybrid automatic repeat request (HARQ) indicator channel (PHICH) when an uplink grant is transmitted over the physical downlink control channel (PDCCH).

19. The apparatus of claim 15, in which the at least one processor is further configured to determine whether the resource allocation is out of synchronization by:
blindly decoding a physical uplink shared channel (PUSCH) and a physical uplink control channel (PUCCH); and
determining that an uplink grant was not received by the UE when a successfully decoded PUCCH includes uplink control information (UCI) due to a loss resource allocation synchronization between the UE and the eNodeB.

20. The apparatus of claim 15, in which the at least one processor is further configured to determine whether the resource allocation is out of synchronization by:
detecting a number of consecutive retransmission decode failures of uplink control information (UCI) over a physical uplink shared channel (PUSCH) and PUSCH data; and
determining that the initial uplink grant was not received by the UE over the PUSCH when the number of consecutive retransmission decode failures of the UCI over the PUSCH and the PUSCH data exceeds a predetermined value due to a loss resource allocation synchronization between the UE and the eNodeB.

21. The apparatus of claim 15, in which the at least one processor is further configured to mitigate the loss of resource allocation synchronization between the UE and the eNodeB by:
decoding received physical uplink shared channel (PUSCH) data and uplink control information (UCI) according to a previous uplink grant; and
decoding the received PUSCH data and the UCI according to the initial uplink grant.

22. The apparatus of claim 15, in which the at least one processor is further configured to mitigate the loss of resource allocation synchronization between the UE and the eNodeB by:
transmitting a subsequent uplink grant through the physical downlink control channel (PDCCH) according to a number of physical uplink shared channel (PUSCH) resource blocks (RBs) and presence or absence of a sounding reference signal (SRS) in response to the initial uplink grant to ensure a same number of resource elements (REs) are calculated for uplink control information (UCI).

23. The apparatus of claim 15, in which the at least one processor is further configured to mitigate the loss of resource allocation synchronization between the UE and the eNodeB by:
transmitting a subsequent uplink grant through the physical downlink control channel (PDCCH) according a number of resource blocks of a physical uplink shared channel (PUSCH) provided with the initial uplink grant;
decoding received PUSCH data assuming presence of a sounding reference signal (SRS);
decoding the received PUSCH data assuming absence of the SRS; and
selecting the decoded PUSCH data assuming the presence of the SRS or the decoded PUSCH data assuming the absence of the SRS as successfully decoded PUSCH data.

24. The apparatus of claim 15, in which the at least one processor is further configured to determine whether the resource allocation is out of synchronization by:
determining an uplink grant was not received by the UE over a physical uplink shared channel (PUSCH) when an accumulated energy of received PUSCH data does not increase over a number of consecutive retransmission decode failures during a hybrid automatic repeat request (HARQ) transmission and/or retransmission process.

25. The apparatus of claim 15, in which the at least one processor is further configured to mitigate the loss of resource allocation synchronization between the UE and the eNodeB by:
transmitting a physical hybrid automatic repeat request (HARQ) indicator channel (PHICH) negative acknowledgement (NAK) to the UE; and transmitting a new, initial transmission uplink grant to the UE according to the initial uplink grant.

26. The apparatus of claim 15, in which the at least one processor is further configured to mitigate the loss of resource allocation synchronization between the UE and the eNodeB by synchronizing a redundancy version (RV) in response to receiving a hybrid automatic repeat request (HARQ) retransmission by synchronizing a number of transmission by discounting a lost uplink grant or using an adaptive physical uplink shared channel (PUSCH) retransmission uplink grant to prevent a loss of RV synchronization between the UE and the eNodeB.

27. The apparatus of claim 15, in which the at least one processor is further configured to mitigate the loss of resource allocation synchronization between the UE and the eNodeB by communicating with the UE according to an estimate of whether the UE received the initial uplink grant for a physical uplink shared channel (PUSCH) hybrid automatic repeat request (HARQ) retransmission.

28. The apparatus of claim 15, in which the at least one processor is further configured to simultaneously receive a physical uplink shared channel (PUSCH), over a PUSCH resource, and a physical uplink control channel (PUCCH), over a PUCCH resource.

29. A computer program product configured for wireless communication, the computer program product comprising:

a computer-readable medium having non-transitory program code recorded thereon, the program code comprising:
program code to predict loss of an initial uplink grant prior to transmission of the initial uplink grant to a user equipment (UE) based on historical data; and
program code to mitigate a potential loss of resource allocation synchronization between the UE and an evolved Node B (eNodeB) by increasing a power level and/or an aggregation level from a current power level and/or a current aggregation level of a physical downlink control channel (PDCCH) when the initial uplink grant loss is predicted prior to transmission of the initial uplink grant.

30. An apparatus operable in a wireless communication system, the apparatus comprising:
means for predicting loss of an initial uplink grant prior to transmission of the initial uplink grant to a user equipment (UE) based on historical data and
means for mitigating a potential loss of resource allocation synchronization between the UE and an evolved Node B (eNodeB) by increasing a power level and/or an aggregation level from a current power level and/or a current aggregation level of a physical downlink control channel (PDCCH) when the initial uplink grant loss is predicted prior to transmission of the initial uplink grant.

* * * * *